United States Patent
Konigbauer

(10) Patent No.: US 6,882,127 B2
(45) Date of Patent: Apr. 19, 2005

(54) ELECTRICAL HAND TOOL MACHINE WITH SOFT-START

(75) Inventor: Egon Konigbauer, Eichenau (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/653,644

(22) Filed: Sep. 2, 2003

(65) Prior Publication Data

US 2004/0113583 A1 Jun. 17, 2004

(30) Foreign Application Priority Data

Sep. 4, 2002  (DE) .......................................... 102 40 719

(51) Int. Cl.$^7$ ................................................. H02P 1/26
(52) U.S. Cl. ........................ 318/778; 318/434; 318/432
(58) Field of Search .................. 318/778, 434, 318/432; 307/129, 150; 173/12; 388/937

(56) References Cited

U.S. PATENT DOCUMENTS

| | | | | | |
|---|---|---|---|---|---|
| 3,593,692 | A | * | 7/1971 | Scholl et al. ................ | 123/484 |
| 4,614,843 | A | * | 9/1986 | Coulmance .................. | 379/352 |
| 4,683,975 | A | * | 8/1987 | Booth et al. ................. | 180/289 |
| 5,014,793 | A | * | 5/1991 | Germanton et al. ........ | 173/181 |
| 5,469,002 | A | * | 11/1995 | Garrett ........................ | 307/150 |
| 6,222,285 | B1 | * | 4/2001 | Haley et al. ................. | 307/129 |

* cited by examiner

*Primary Examiner*—Karen Masih
(74) *Attorney, Agent, or Firm*—Sidley Austin Brown & Wood, LLP

(57) ABSTRACT

An electrical hand tool machine (1) having a motor switch (2) configured as a button and a current regulator (4) disposed in the current circuit of an electrical motor (3), having a soft-start input (5), in whose branch current a timing capacitor (6) is arranged. A current-direction-dependent element (7) is arranged between the soft-start input (5) and the capacitor (6).

4 Claims, 1 Drawing Sheet

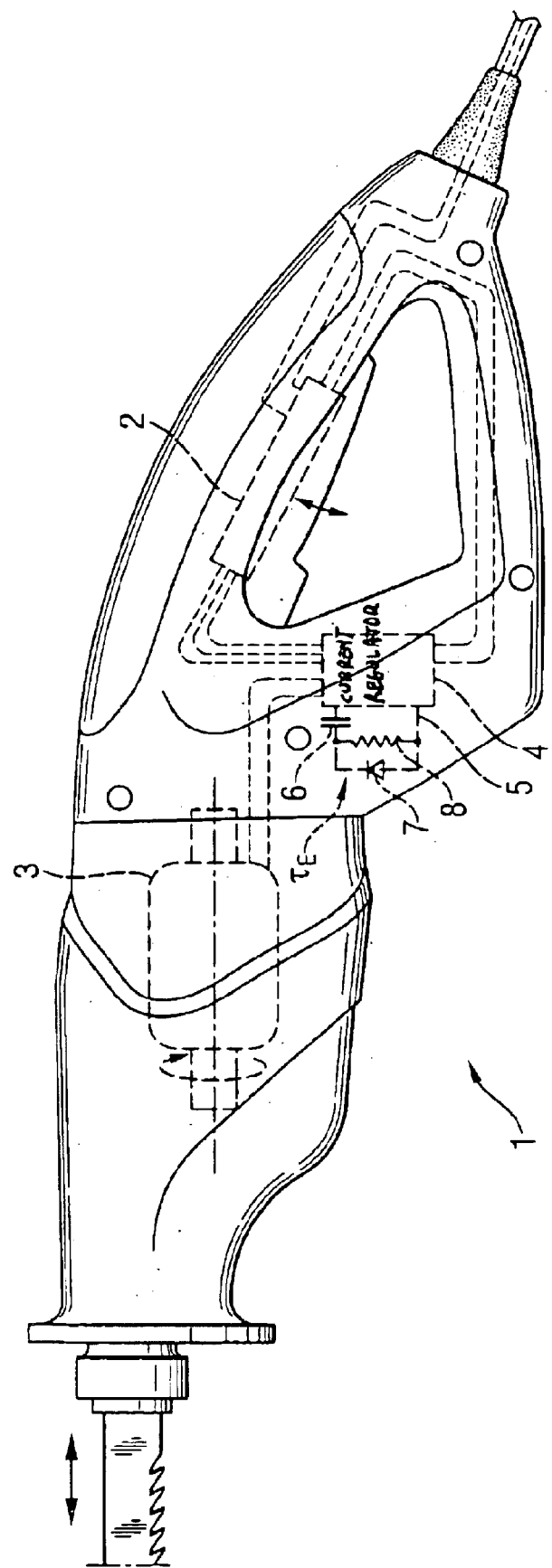

ELECTRICAL HAND TOOL MACHINE WITH SOFT-START

BACKGROUND OF THE INVENTION

The invention relates to an electrical hand tool machine having a current regulator disposed in the current circuit of an electrical motor having a wired soft-start input.

A damped soft-start controlled over approximately 0.5 to 2 seconds up to the desired motor r.p.m. is common in electrical hand tool machines for preventing sudden torque. Some integrated current regulators have a soft-start input for this purpose, which is controlled by the load current of an externally wired capacitor that acts in a timing manner. In electrical hand tool machines with a motor switch configured as a button, gripping by the guiding hand results in unintentional disconnection of the drive and consequently, despite a controlled running tool, resumes soft-start, wherein the desired r.p.m. is unavailable.

According to DE 19609986, a wiring arrangement for controlling an electrical motor of a hand tool machine has a current regulator arranged in the current circuit with an input for soft-start and is connected directly to a timing capacitor and to a diode as an additional discharge branch for the capacitor, wherein repeated, pulse-like controlled run is achieved.

SUMMARY OF THE INVENTION

The object of the invention is to provide an electrical hand tool machine having a soft-start, which is deactivated in the event of a disconnection of short duration.

This object is achieved in accordance with the invention by an electrical hand tool machine having a motor switch, in the form of a button, and a current regulator arranged in the current circuit of an electrical motor with soft-start input, in whose branch current a timing capacitor is arranged, wherein a current-direction dependent module is arranged between the soft-start input and the capacitor.

By virtue of the current direction-dependent module arranged in series with the timing capacitor and in the event of brief interruptions, wherein the potential of the soft-start input diminishes to low ohmage, the soft-start input is disconnected from the timing capacitor, which consequently maintains its charge essentially until the restoration of current of the current regulator and thus does not cause a recurrence of soft-start.

Advantageously, the current-direction-dependent element is configured as a diode, which is available as a standard component.

Advantageously, a timing resistor is arranged parallel to the current-direction-dependent element, in which, in conjunction with the timing capacitor, a discharge time constant is defined, whereby a minimal time is defined, after which a new soft-start occurs.

Advantageously, the discharge time constant is in the range of time of from 0.1 to 1.0 second, whereby an interruption without soft-start is coordinated with movement of the tool.

BRIEF DESCRIPTION OF THE INVENTION

The exemplary embodiment of the invention will be more completely explained below with reference to the drawings, wherein FIG. 1 shows an electrical hand tool machine with soft-start, in accordance with the invention.

DETAILED DESCRIPTION OF THE INVENTION

According to the FIG. 1, an electrical hand tool machine 1 has a motor switch 2 configured as a button and a current regulator 4 having a soft-start input 5, in whose branch current a timing capacitor 6 is disposed, arranged in the current circuit of the electrical motor 3. An element is arranged between the soft-start input 5 and the capacitor 6 in the form of a diode, whose anode is connected to the soft-start input 5 and whose cathode is connected to the capacitor 6. A timing resistor 8 is arranged parallel to the current-direction-dependent element 7. The discharge time constant $T_E$ formed by the product of the capacitance C of the timing capacitor 6 and the resistance value R of the resistor 8 is in the range of time of from 0.1 to 1.0 second.

What is claimed is:

1. An electrical hand tool machine having a motor switch (2) formed as a button and a current regulator (4) having a soft-start input (5) including a branch current with a timing capacitor (6) arranged therein, said current regulator (4) is disposed in the current circuit of an electrical motor (3), wherein a current-direction-dependent element (7) is disposed between the soft-start input (5) and the capacitor (6).

2. The electrical hand tool machine of claim 1, wherein the current-direction-dependent element (7) is a diode.

3. The electrical hand tool machine of claim 1, wherein a timing resistor (8) is arranged parallel to the current-direction-dependent element (7).

4. The electrical hand tool machine of claim 1, wherein the discharge time constant $T_E$ is in the range of time of from 0.1 to 1.0 seconds.

* * * * *